(12) United States Patent
Cheng et al.

(10) Patent No.: US 8,585,210 B2
(45) Date of Patent: Nov. 19, 2013

(54) PROJECTION APPARATUS AND PROJECTION LENS

(75) Inventors: Chu-Ming Cheng, Hsin-Chu (TW); Chih-Hsien Tsai, Hsin-Chu (TW)

(73) Assignee: Young Optics Inc. (TW)

( * ) Notice: Subject to any disclaimer, the term of this patent is extended or adjusted under 35 U.S.C. 154(b) by 282 days.

(21) Appl. No.: 12/801,265

(22) Filed: Jun. 1, 2010

(65) Prior Publication Data

US 2010/0309443 A1    Dec. 9, 2010

(30) Foreign Application Priority Data

Jun. 3, 2009    (TW) ............................... 98118428 A (51) Int. Cl.
*G03B 21/28*    (2006.01)
(52) U.S. Cl.
USPC ............................................ 353/81; 359/669
(58) Field of Classification Search
USPC .............. 353/81, 98; 359/669, 832, 837, 649, 359/650, 651
See application file for complete search history.

(56) References Cited

U.S. PATENT DOCUMENTS

| | | | |
|---|---|---|---|
| 6,299,312 B1 | 10/2001 | Choi et al. | |
| 6,478,429 B1 | 11/2002 | Aritake et al. | |
| 6,512,636 B2 | 1/2003 | Schauss | |
| 6,678,095 B2 * | 1/2004 | Kelly | 359/669 |
| 6,688,748 B2 | 2/2004 | Lewis et al. | |
| 7,259,918 B2 * | 8/2007 | Matsuoka et al. | 359/649 |
| 2007/0030456 A1 * | 2/2007 | Duncan et al. | 353/20 |
| 2010/0321789 A1 * | 12/2010 | Kelly | 359/669 |

FOREIGN PATENT DOCUMENTS

| | | |
|---|---|---|
| JP | 5-5838 | 1/1993 |
| TW | 520041 | 2/2003 |
| TW | 200612177 | 4/2006 |
| TW | 200730993 | 8/2007 |

OTHER PUBLICATIONS

MikeP, "DIY Anamorphic Lens", Undated, http://www.zuggsoft.com/theater/prism.htm.
English translation of Taiwanese Office Action issued Dec. 26, 2012 and Taiwanese Office Action in the counterpart Taiwanese application.

* cited by examiner

*Primary Examiner* — Francis M Legasse, Jr.
*Assistant Examiner* — Jerry Brooks
(74) *Attorney, Agent, or Firm* — MH2 Technology Law Group LLP (57) ABSTRACT

A projection apparatus capable of projecting an image on a screen including a light valve and a projection lens is provided. The light valve is capable of generating an image beam. The projection lens is disposed in a transmission path of the image beam and disposed between the light valve and the screen to project the image beam to form the image on the screen. The projection lens has an optical axis. The light valve deviates an offset of X % from the optical axis in a first direction, and the image deviates an offset of Y % from the optical axis in a second direction. The first direction is opposite to the second direction. The projection lens includes a lens group and an anamorphic device. The anamorphic device is disposed in a transmission path of the image beam and disposed between the lens group and the screen to make X %<Y %.

21 Claims, 10 Drawing Sheets

PROJECTION APPARATUS AND PROJECTION LENS

CROSS-REFERENCE TO RELATED APPLICATION

This application claims the priority benefit of Taiwan application serial no. 98118428, filed on Jun. 3, 2009.

BACKGROUND OF THE INVENTION

1. Field of the Invention

The invention generally relates to a projection apparatus and a projection lens.

2. Description of Related Art

With the development of technique, various kinds display apparatus different from the conventional cathode ray tube (CRT) display apparatus has been researched and promoted. The display apparatus includes a liquid crystal display (LCD), a plasma display panel (PDP), an organic light emitting diode (OLED) display, and other panel display. In addition, the researched promoted display also includes a projector, a rear projection display, and other projection apparatus.

Although the LCD and the PDP are the main displays in the daily life now, the projection apparatus may provide a large size image (for example more than 52 inches) with lower cost, so the projection apparatus may not be replaced in large size image display. In addition, with the development of manufacture technique, the manufacture of the projector develops with lower cost and price. The present projector is used in the office, education place and research department. Meanwhile, it is a popular trend that a family has a home theatre with a projector.

With respect to the projection apparatus, an illumination system is used to form an illumination beam illuminating on a light valve, and the light valve converts the illumination beam into an image beam. A projection lens is disposed in the transmission path of the image beam to project the image beam to form an image on the screen.

With respect to the projection apparatus, an anamorphic lens is used to achieve some specific optical effect, or improve the optical quality. For example, a wedge prism disposes between a light combining prism and the projection lens to correct the colour difference and aberration generated by the prism in U.S. Pat. No. 6,299,312. In the other sides, a wedge prism in the projection system disposes before the display to deflect the direction of the light beam in U.S. Pat. No. 6,688,748. The display tilts an angle to correct the distortion, and the centre position of the display deviates from the optical axis to perform the optimization of the projection image.

An image distortion correction prism disposed between a dichroic cross prism and the projection lens to correct aberration in U.S. Pat. No. 6,478,429. In addition, two cylindrical lenses in the projection lens to improve the length-width ratio of the projection image in U.S. Pat. No. 6,512,636.

Although the disposition of the above-mentioned anamorphic lens solves some problem of the projection apparatus and improves the optical quality, the following problems still have not been solved.

Due to the projection apparatus is usually disposed on the desk or ceiling mounts and projects the image beam to form the image on the screen, the image beam may deviate from the optical axis of the projection lens so as to the image deviates from the optical axis for avoiding the image beam projecting on the desk or ceiling. In conventional method, the light valve deviates from the optical axis, so as to the image beam emits atilt from the optical axis of the projection lens and the image also deviates from the optical.

In addition, adopting the mentioned technique, the deviation of the light valve is similar to the deviation of the image. For example, if we want to the image deviate an offset of Z % from the optical axis, the light valve may deviate an offset of Z % from the optical axis.

However, excess offset of the light valve may result in excess maximum field of the projection lens to cause the outside diameter of the lens in the projection lens hard to reduce and then forms too large volume of the projection lens and the volume of the projection apparatus.

SUMMARY OF THE INVENTION

The invention provides a projection apparatus, and the projection apparatus having a projection lens to occupy less space.

The invention provides a projection lens, and the projection lens has small volume.

Other objectives and advantages of the invention may be further indicated by the disclosures of the invention.

To achieve at least one of the objectives, or other objectives, an embodiment of the invention provides a projection apparatus. The projection apparatus is capable of projecting an image on a screen. The projection apparatus includes a light valve and a projection lens. The light valve is capable of generating an image beam. The projection lens is disposed in the transmission path of the image beam, and disposed between the light valve and the screen to project the image beam to form the image on the screen. The projection lens has an optical axis, the light valve deviates an offset of X % from the optical axis in a first direction, the image deviates an offset of Y % from the optical axis in a second direction, and the first direction is opposite to the second direction. The projection lens includes a lens group and an anamorphic device. The lens group is disposed in the transmission path of the image beam. The anamorphic device is disposed in the transmission path of the image beam and disposed between the lens group and the screen to make X %<Y %. The anamorphic device includes an anamorphic transparent plate, and the anamorphic transparent plate has a first light transmission area capable of allowing the image beam to pass through. The first light transmission area has a first end and a second end opposite to the first end, an angle between a first extending direction from the first end to the second end and the second direction is less than 90 degrees, and the thickness of the second end is more than the first end in the first light transmission area.

In one embodiment of the invention, the thickness of the first light transmission area increases from the first end to the second end. The first light transmission area has a first light incident surface and a first light emitting surface opposite to the first light incident surface, the first light emitting surface is disposed between the first light incident surface and the screen, the first light incident surface and the first light emitting surface are respectively planes, and the anamorphic transparent plate is a prism. In one embodiment of the invention, the first light transmission area has a first light incident surface and a first light emitting surface opposite to the first light incident surface, the first light emitting surface is disposed between the first light incident surface and the screen, the first light incident surface and the first light emitting surface are respectively curved surfaces, and the anamorphic transparent plate is a lens. In one embodiment of the invention, the first light transmission area has a first light incident surface and a first light emitting surface opposite to the first light incident surface, the first light emitting surface is disposed between the first light incident surface and the screen, one of the first light incident surface and the first light emitting surface is a curved surface, the other of the first light incident surface and the first emitting surface is a plane, and the anamorphic transparent plate is a lens.

In one embodiment of the invention, the anamorphic device further includes a compensation transparent plate disposed between the anamorphic transparent plate and the screen. The compensation transparent plate has a second light transmission area capable of allowing the image beam to pass through, and the second light transmission area has a third end and a fourth end opposite to the third end. An angle between a second extending direction from the third end to the fourth end and the second direction is less than 90 degrees, and the thickness of the fourth end is less than the third end in the second light transmission area.

In one embodiment of the invention, the thickness of the second light transmission area increases from the fourth end to the third end. The second light transmission area has a second light incident surface and a second light emitting surface opposite to the second light incident surface, the second light emitting surface is disposed between the second light incident surface and the screen, the second light incident surface and the second light emitting surface are respectively planes, and the compensation transparent plate is a prism. In one embodiment of the invention, the second light transmission area has a second light incident surface and a second light emitting surface opposite to the second light incident surface, the second light emitting surface is disposed between the second light incident surface and the screen, the second light incident surface and the second light emitting surface are respectively curved surfaces, and the compensation transparent plate is a lens. In one embodiment of the invention, the second light transmission area has a second light incident surface and a second light emitting surface opposite to the second light incident surface, the second light emitting surface is disposed between the second light incident surface and the screen, one of the second light incident surface and the second light emitting surface is a curved surface, the other of the second light incident surface and the second light emitting surface is a plane, and the compensation transparent plate is a lens.

In one embodiment of the invention, the first light transmission area has a first light incident surface and a first light emitting surface opposite to the first light incident surface, the first light emitting surface is disposed between the first light incident surface and the compensation transparent plate. The second light transmission area has a second light incident surface and a second light emitting surface opposite to the second light incident surface and the second light emitting surface is disposed between the second light incident surface and the screen. The second light incident surface is adjacent to the first light emitting surface, and the shape of the second light incident surface is substantially coincident with the shape of the first light emitting surface.

In one embodiment of the invention, a normal vector of an active surface of the light valve is tilted to the optical axis. The lens group includes at least a tilted lens, and an optical axis of the tilted lens is tilted to the optical axis of the projection lens. The lens group includes an eccentric lens, and a geometrical center of the eccentric lens maintains a distance with the optical axis of the projection lens.

Another embodiment of the invention provides a projection apparatus. The projection apparatus is capable of projecting an image on a screen. The projection apparatus comprises a light valve and a projection lens. The light valve is capable of generating an image beam. The projection lens is disposed in the transmission path of the image beam, and disposed between the light valve and the screen to project the image beam to form the image on the screen. The projection lens has an optical axis, the light valve deviates from the optical axis in a first direction, the image deviates from the optical axis in a second direction, and the first direction is opposite to the second direction. The projection lens includes a lens group and an anamorphic device. The lens group is disposed in the transmission path of the image beam. The anamorphic device is disposed in the transmission path of the image beam and disposed between the lens group and the screen. The anamorphic device includes an anamorphic transparent plate, the anamorphic transparent plate has a first light transmission area capable of allowing the image beam to pass through, and the first light transmission area has a first end and a second end opposite to the first end. An angle between a first extending direction from the first end to the second end and the second direction is less than 90 degrees, and the thickness of the second end is more than the first end in the first light transmission area.

Another embodiment of the invention provides a projection lens. The projection lens is capable of projecting an image beam generating from a light valve to generate an image on a screen. The projection lens includes an optical axis, a lens group, and an anamorphic device. The light valve deviates an offset of X % from the optical axis in a first direction, the image deviates an offset of Y % from the optical axis in a second direction, and the first direction is opposite to the second direction. The lens group is disposed in the transmission path of the image beam. The anamorphic device is disposed in the transmission path of the image beam and disposed between the lens group and the screen to make X %<Y %. The anamorphic device includes an anamorphic transparent plate. The anamorphic transparent plate has a first light transmission area capable of allowing the image beam to pass through. The first light transmission area has a first end and a second end opposite to the first end. An angle between a first extending direction from the first end to the second end and the second direction is less than 90 degrees, and the thickness of the second end is more than the first end in the first light transmission area.

From above, the projection lens of the embodiment of the invention adopts an anamorphic device, wherein the thickness of the second end is more than the thickness of the first end in the first light transmission area of the anamorphic device. The offset of the image deviating from the optical axis is increased by the refraction function of the anamorphic transparent plate, so the offset of the light valve deviating from the optical axis may be designed with small size to reduce the maximum field. In this way, the outside diameter of the lens in the projection lens may be reduced to make the volume of the projection lens reduced. Because the projection apparatus of the embodiment of the invention adopts the projection lens, the projection lens to occupy less space, and further makes the volume, weight, and cost of the projection apparatus to be reduced.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
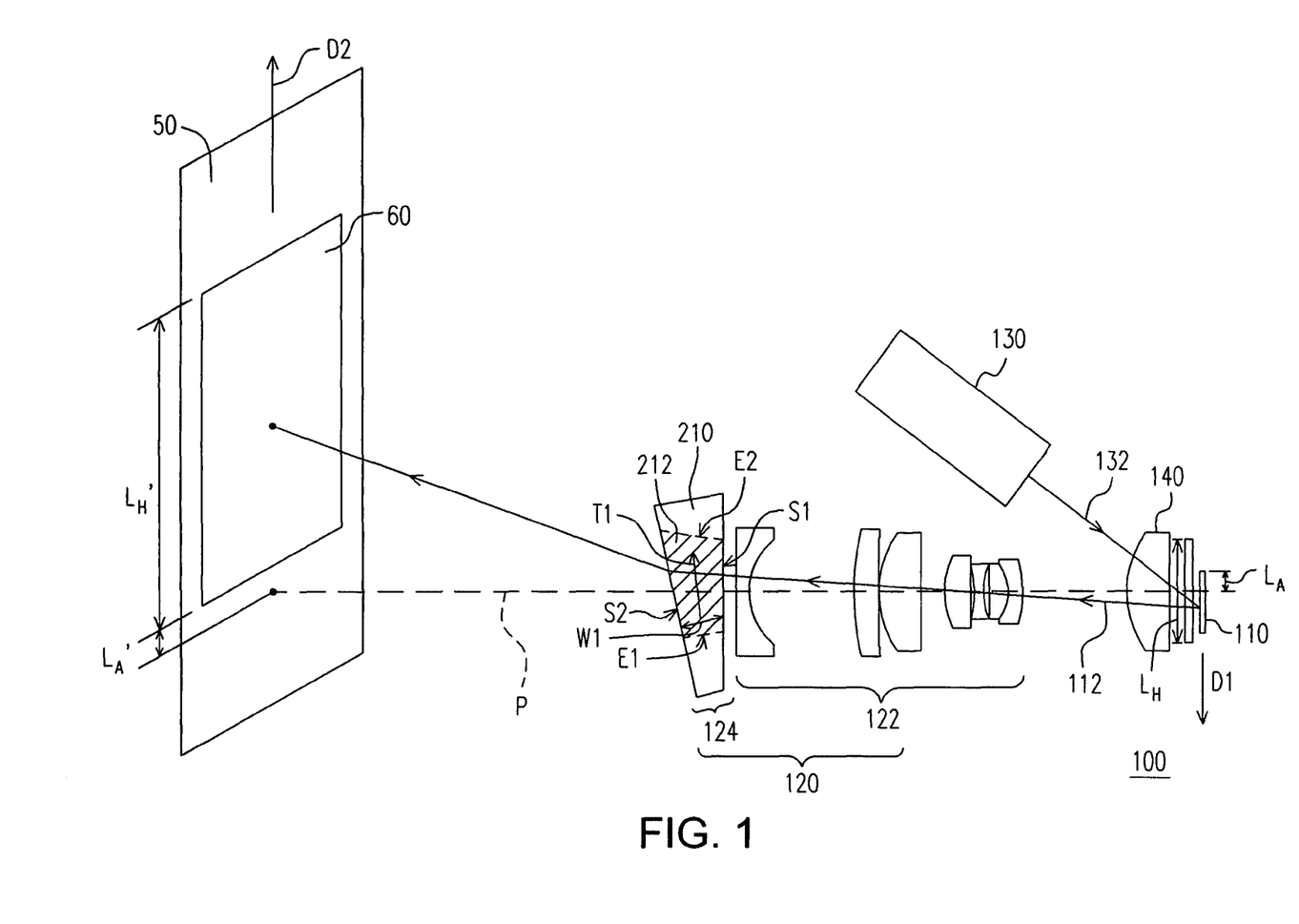
FIG. 1 is a structure diagram of a projection apparatus according to one embodiment of the invention.

Referring to FIG. 1, the projection apparatus 100 is capable of projecting an image 60 on a screen 50. The projection apparatus 100 includes a light valve 110 and a projection lens 120. The light valve 110 is capable of generating an image beam 112. In the embodiment, the projection apparatus 100 further includes a illumination system 130, and the illumination system 130 is capable of emitting an illumination beam 132. In the embodiment, the illumination beam 132 may be converged at the light valve 110 through a field lens 140. The light valve 110 is, for example, a digital micro-mirror device (DMD). However, in other embodiments, the light valve 110 may be a liquid-crystal-on-silicon panel (LCOS panel) or other spatial light modulator. The illumination beam 132 may be reflected by the light valve 110 and be converted to an image beam 112, and the image beam 112 may pass through the lens 140.

The projection lens 120 is disposed in the transmission path of the image beam 112, and disposed between the light valve 110 and the screen 50 to project the image beam 112 to form the image 60 on the screen 50. The projection lens 120 has an optical axis P, the light valve 110 deviates an offset of X % from the optical axis P in a first direction D1, the image 60 deviates an offset of Y % from the optical axis P in a second direction D2, and the first direction D1 is opposite to the second direction D2.

The offset is defined by the following formula $$\text{offset} \equiv \frac{\left(A + \frac{H}{2}\right)}{\frac{H}{2}} \times 100\% \text{ or offset} \equiv \frac{(A + H)}{H} \times 100\%$$

In the formula, A is the distance from one edge of the light valve closed to the optical axis P to the optical axis P of the projection lens 120. Besides, A also can be a distance from one edge of the image closed to the optical axis P to the optical axis P of the projection lens 120. If the optical axis P is through a point in the light valve or image, the value of A is negative. Conversely, if the optical axis P does not intersect the light valve or image, the value of A is positive. H is the width of the light valve or image in the deviating direction, and the values of H are all positive. For example, in the embodiment, the value of A of the light valve 110 is negative as the distance $L_A$ shown in FIG. 1, the value of H of the light valve 110 is the distance $L_H$ shown in FIG. 1.

The projection lens 120 includes a lens group 122 and an anamorphic device 124. The lens group 122 is disposed in the transmission path of the image beam 112. The anamorphic device 124 is disposed in the transmission path of the image beam 112 and disposed between the lens group 122 and the screen 50 to make X %<Y %.

In more detail, the anamorphic device 124 includes an anamorphic transparent plate 210. The anamorphic transparent plate 210 has a first light transmission area 212 capable of allowing the image beam 112 to pass through. The first light transmission area 212 has a first end E1 and a second end E2 opposite to the first end E1, an angle between a first extending direction T1 from the first end E1 to the second end E2 and the second direction D2 is less than 90 degrees, and the thickness W1 of the first light transmission area 212 in the second end E2 is more than the thickness W1 of the first light transmission area 212 in the first end E1. In the embodiment, the thickness W1 of the first light transmission area 212 increases from the first end E1 to the second end E2. In addition, the first light transmission area 212 has a first light incident surface S1 and a first light emitting surface S2 opposite to first light incident surface S1, the first light emitting surface S2 is disposed between the first light incident surface S1 and the screen 50, and the first light incident surface 51 and the first light emitting surface S2 are respectively planes. In other word, in the embodiment, the anamorphic transparent plate 210 is a prism.

Because the projection lens 120 of the embodiment has the anamorphic device 124, and the thickness W1 of the anamorphic transparent plate 210 in the first light transmission area 212 increases from the first end E1 to the second end E2, the image beam 112 may deviate to the second direction D2 to make X %<Y % after the image beam 112 passes through the anamorphic device 124. When the offsets of the image is coincident with the environmental condition, the offset of the light valve 110 of the projection apparatus 100 adopting the projection lens 120 of the embodiment may be designed with small size to produce the offset of the image the user needs. When the offset of the light valve 110 is designed with small size, the maximum field of the projection lens 120 may be small, so that the outside diameter of the lens in the projection lens 120 may be reduced. The following description may describe the concept of the maximum field according to FIGS. 2A and 2B.

Figure 2A:
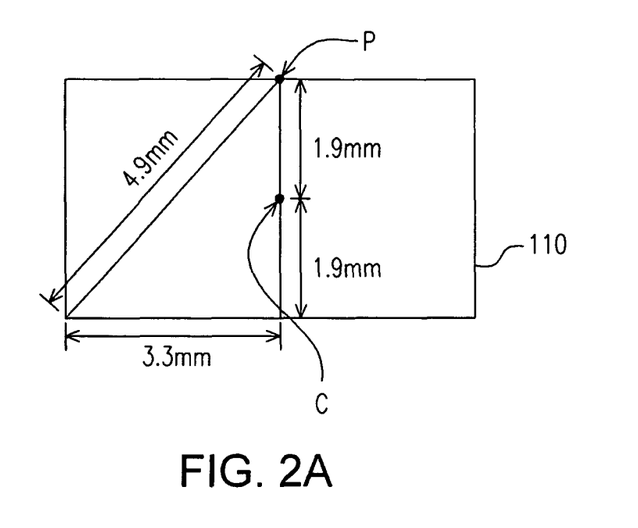
FIGS. 2A and 2B are diagrams showing the maximum field at two different offset of the light valve.

Please refer to FIGS. 1 and 2A, when the optical axis P of the projection lens 120 is coincident with the edge of the light valve 110, the value of A of the light valve 110 is 0. The value of A is employed in the above-mentioned formula of the offset to calculate the offset, and the offset is 100%. Supposing the value of H/2 of the light valve 110 is 1.9 mm, the distance between the optical axis P and the center C of the light valve 110 is 1.9 mm, and the half width of the light valve 110 is 3.3 mm in the direction perpendicular to the deviating direction, the distance between the optical axis P and the farthest position at the light valve 110 is 4.9 mm by calculating according to the Pythagorean theorem, and the distance is the maximum field of the projection lens 120 in the disposition way.

Figure 2B:
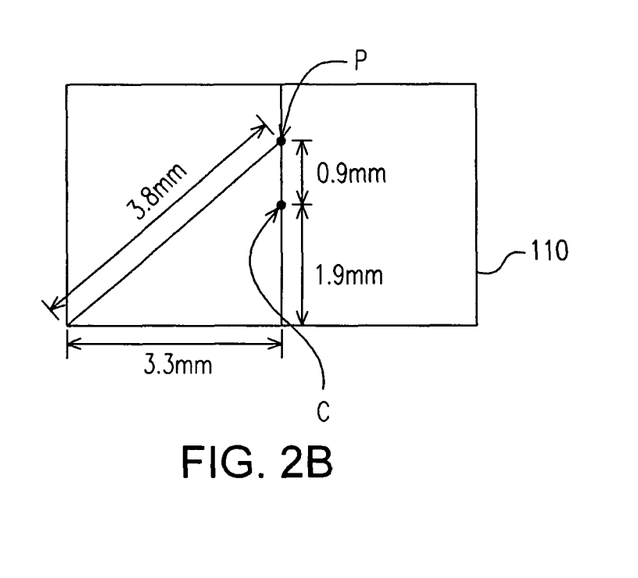

Please refer to FIGS. 1 and 2B, when the optical axis P of the projection lens 120 intersects with the light valve 110, (For example, the distance is between the optical axis P and the center C of the light valve 110 is 0.9 mm) the value of A of the light valve 110 is negative, so the offset of the light valve 110 is less than 100%, that is the offset of the light valve 100 is less than the offset in FIG. 2A. According to the Pythagorean theorem, the distance between the optical axis P and the farthest position in the light valve 110 is 3.8 mm, and the distance is the maximum field of the projection lens 120. Comparing with the maximum field in FIG. 2A, the maximum field in FIG. 2B is smaller than the maximum field in FIG. 2A, so when the offset of the light valve 110 is reduced, the maximum field of the projection lens 120 is also reduced.

Because the maximum field of the projection lens 120 of the embodiment is small, the outside diameter of the lens in the projection lens 120 may be designed with small size, and the volume of the projection lens 120 of the projection apparatus 100 is reduced, and the volume of the projection apparatus 100 of the embodiment is further reduced. For example, when the offset of the needed image 60 is 100%, the offset of the light valve 110 may be less than 100% through operation of the anamorphic device 124. As shown in FIG. 2B, supposing the offset of the light valve 110 is 50%, the half height of the maximum field of the lens is 3.8 mm. And the diameter of the lens of the projection lens 120 is only 7.6 mm to project an image with good quality, and the thickness of the projection apparatus 100 may be reduced by 23%.

In addition, when the maximum field of the projection lens 120 is reduced, the design of the projection lens 120 becomes easier, and the cost and the weight of the projection apparatus 100 and the projection lens 120 can be reduced.

Figure 3:
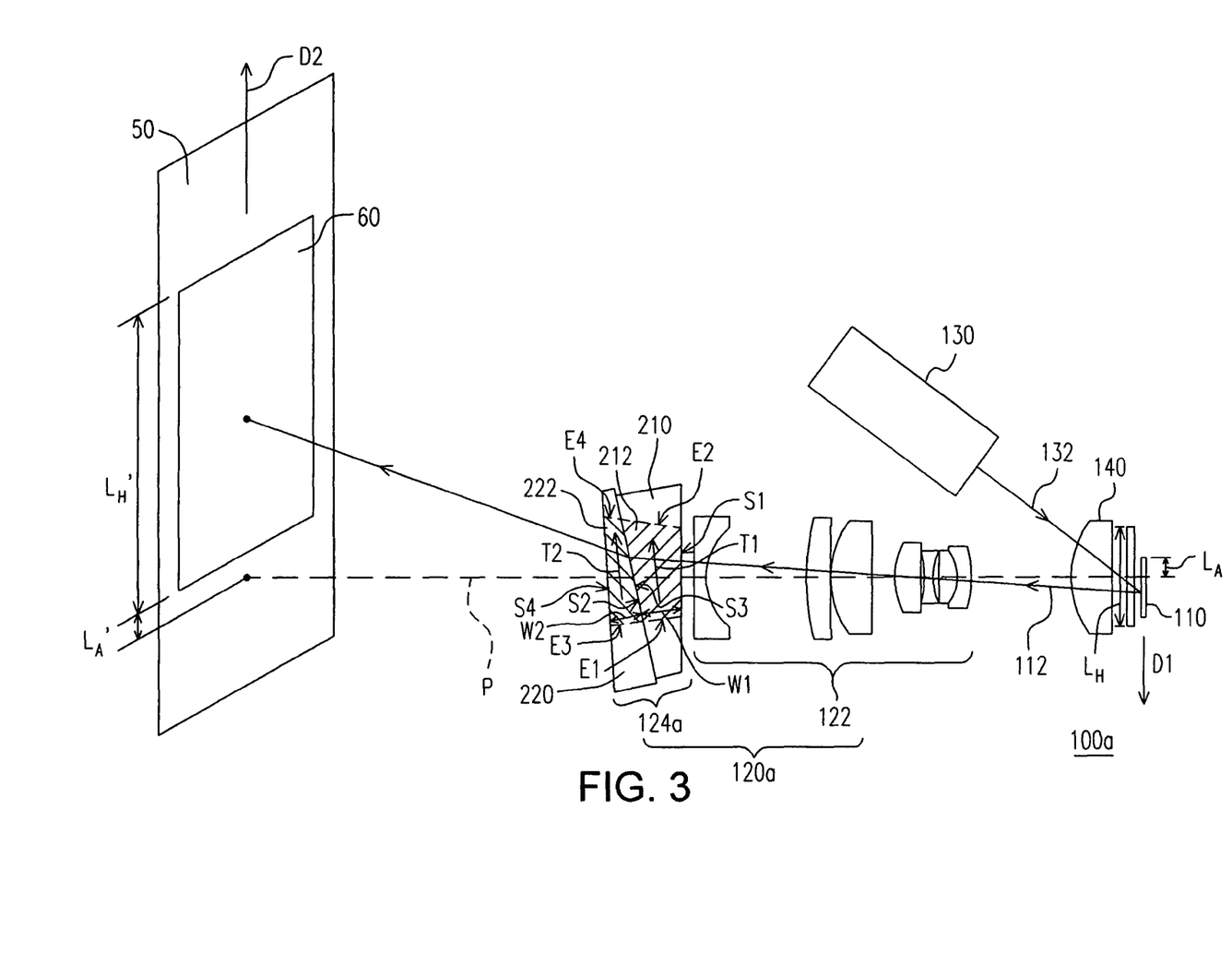
FIG. 3 is a structure diagram of a projection apparatus according to another embodiment of the invention.

Please refer to FIG. 3, the projection apparatus 100a is similar to the above-mentioned projection apparatus 100, and the differences are described as the follows. The anamorphic device 124a of the projection lens 120a of the projection apparatus 100a further includes a compensation transparent plate 220 disposed between the anamorphic transparent plate 210 and the screen 50. The compensation transparent plate 220 has a second light transmission area 222 capable of allowing the image beam 112 to pass through, and the second light transmission area 222 has a third end E3 and a fourth end E4 opposite to the third end E3. An angle between a second extending direction T2 from the third end E3 to the fourth end E4 and the second direction D2 is less than 90 degrees, and the thickness W2 of the second light transmission area 222 in the fourth end E4 is less than the thickness W2 of the second light transmission area 222 in the third end E3. In the embodiment, the thickness W2 of the second light transmission area 222 increases from the fourth end E4 to the third end E3.

In addition, in the embodiment, the second light transmission area 222 has a second light incident surface S3 and a second light emitting surface S4 opposite to second light incident surface S3. The second light emitting surface S4 is disposed between the second light incident surface S3 and the screen 50. Each of the second light incident surface S3 and the second light emitting surface S4 is substantially a plane. In other word, the compensation transparent plate 220 is a prism. The first light emitting surface S2 is disposed between the first light incident surface S1 and the compensation transparent plate 220, the second light emitting surface S4 is disposed between the second light incident surface S3 and the screen 50. In the embodiment, the second light incident surface S3 is adjacent to the first light emitting surface S2, and the shape of the second light incident surface S3 is substantially coincident with the shape of the first light emitting surface S2, that is the second light incident surface S3 and the first light emitting surface S2 are all planes.

The compensation transparent plate 220 may be used to compensate the dispersion and aberration generated by the anamorphic transparent plate 210, to make the image 60 projected by the projection apparatus 100a have low dispersion and aberration, and further to improve the quality of the image 60.

Please refer to FIG. 4, the projection apparatus 100b of the embodiment is similar to the above-mentioned projection apparatus 100a (as shown in FIG. 3), and the differences between the projection apparatus 100b and the projection apparatus 100a are described as follows. In the projection lens 120b of the projection apparatus 100b, one of the first light incident surface S1' and the first light emitting surface S2' of the anamorphic transparent plate 210b of the anamorphic device 124b is a plane, and the other of the first light incident surface S1' and the first light emitting surface S2' is a curved surface. In the embodiment, the first light incident surface S1' is a curved surface, and the first light emitting surface S2' is a plane. In addition, one of the second light incident surface S3' and the second light emitting surface S4' of the compensation transparent plate 220b of the anamorphic device 124b is a plane, and the other of the second light incident surface S3' and the second light emitting surface S4' is a curved surface. In the embodiment, the second light emitting surface S4' is a curved surface, and the first light incident surface S3' is a plane. In other word, in the embodiment, the anamorphic transparent plate 210b and the compensation transparent plate 220b are both lenses. The projection apparatus 100b adopting the anamorphic transparent plate 210b having a curved surface and a compensation transparent plate 220b. It is not only makes X %<Y %, but also makes the anamorphic device 124b to form the image beam 112 convergence or divergence.

In other embodiment, the anamorphic device 124b may also adopt the anamorphic transparent plate 210b only, but not include the compensation transparent plate 220b.

Figure 4:
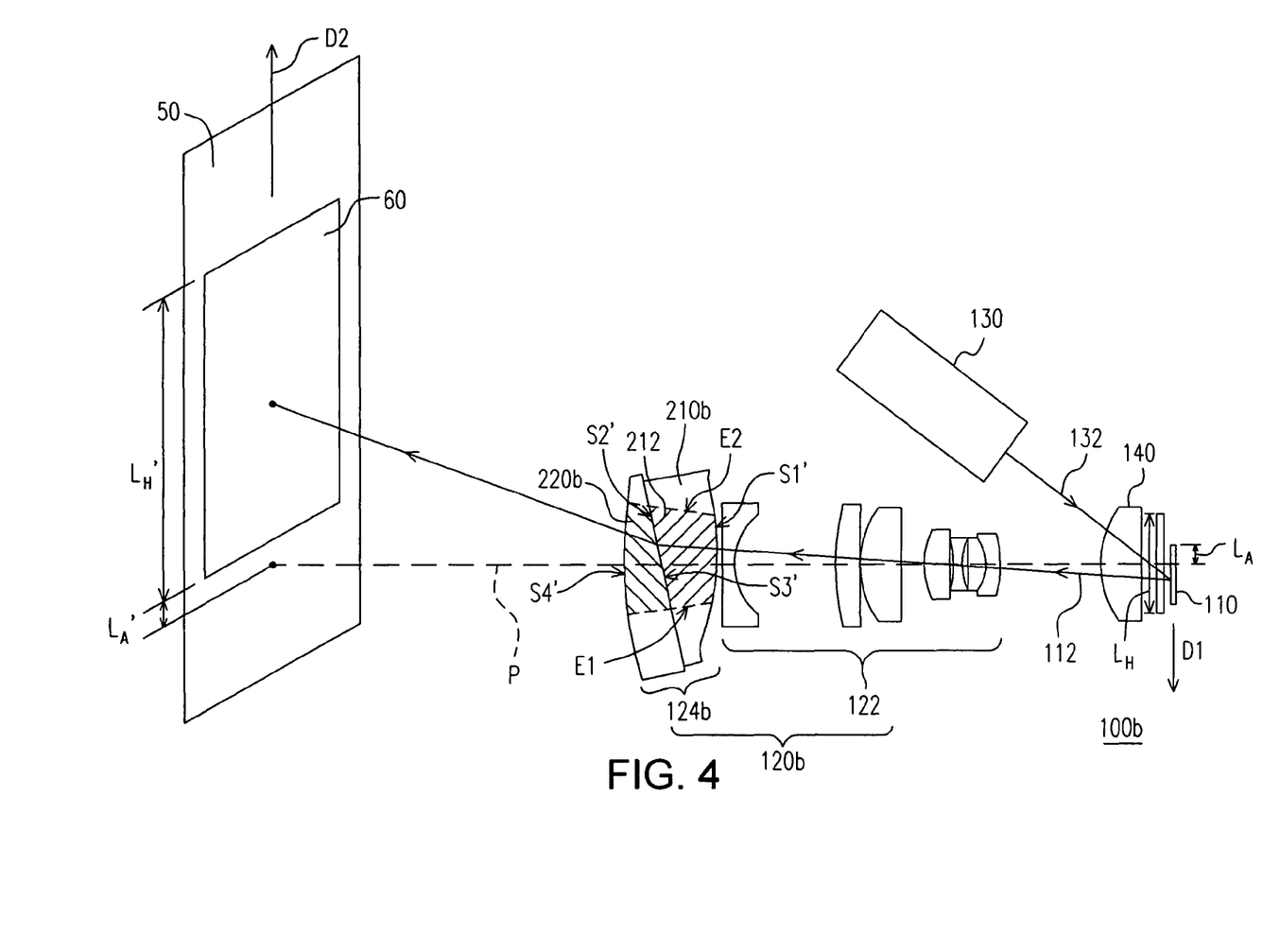
FIG. 4 is a structure diagram of a projection apparatus according to another embodiment of the invention.
Figure 5:
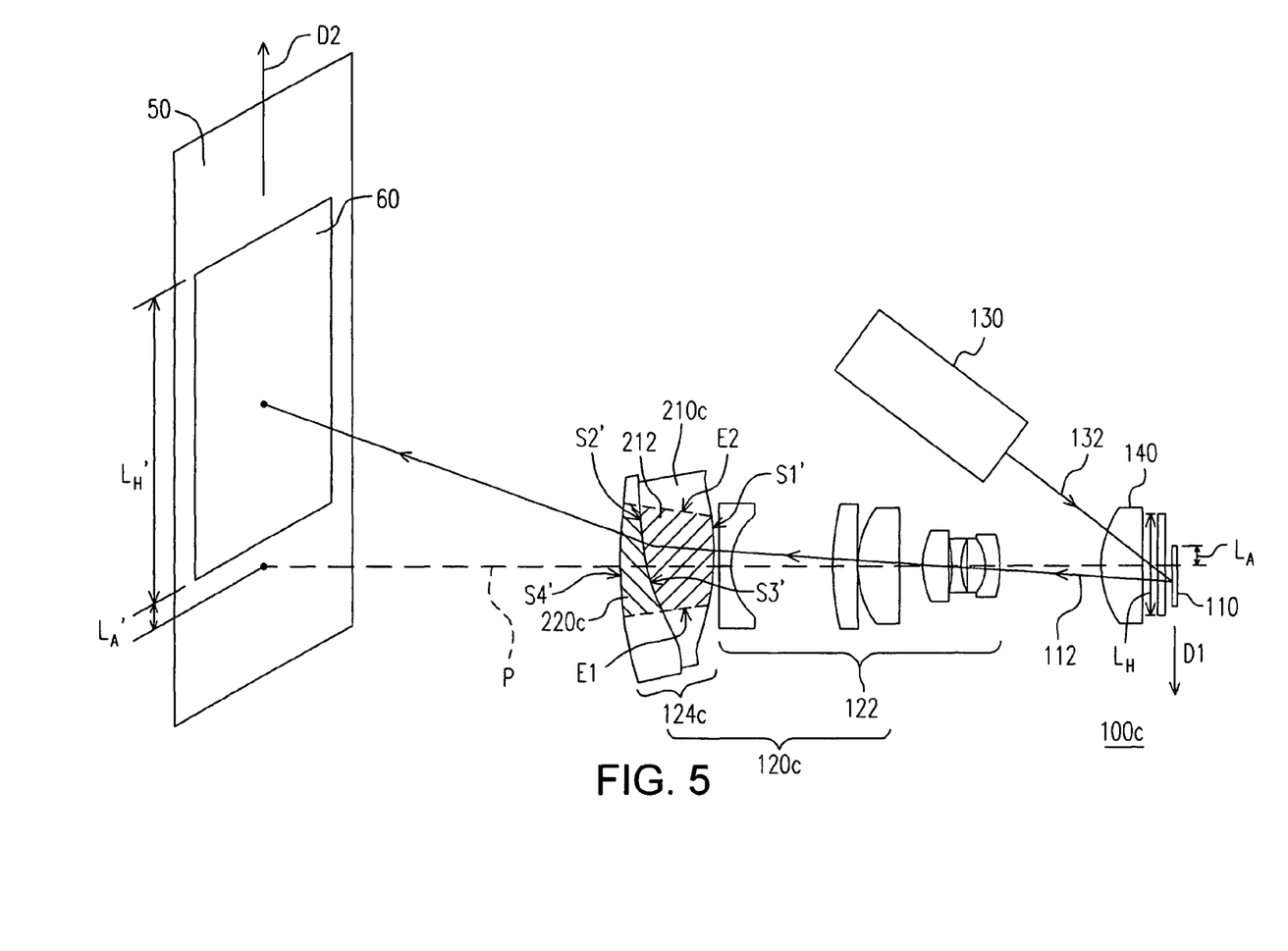
FIG. 5 is a structure diagram of a projection apparatus according to another embodiment of the invention.

Please refer to FIG. 5, the projection apparatus 100c of the embodiment is similar to the above-mentioned projection apparatus 100b (as shown in FIG. 4), and the differences between the projection apparatus 100c and the projection apparatus 100b are described as follows. In the projection lens 120c of the projection apparatus 100c of the embodiment, the first light emitting surface S2' of the anamorphic transparent plate 210c of the anamorphic device 124c is a curved surface, and the second light incident surface S3' of the anamorphic transparent plate 210c of the anamorphic device 124c is a curved surface. The second light incident surface S3' is adjacent to the first light emitting surface S2', and the shape of the second light incident surface S3' is substantially coincident with the shape of the first light emitting surface S2'. In the embodiment, the second light incident surface S3' is a concave surface, the first light emitting surface S2' is a convex surface, and the concave surface bends depending to the convex surface.

In other embodiments, the second light incident surface S3' of the compensation transparent plate 220c may not lean against the first light emitting surface S2', and the shape of the second light incident surface S3' may not be substantially coincident with the shape of the first light emitting surface S2'.

In other embodiments, the anamorphic device 124c may also adopt the anamorphic transparent plate 210c only, but not include the compensation transparent plate 220c.

Figure 6:
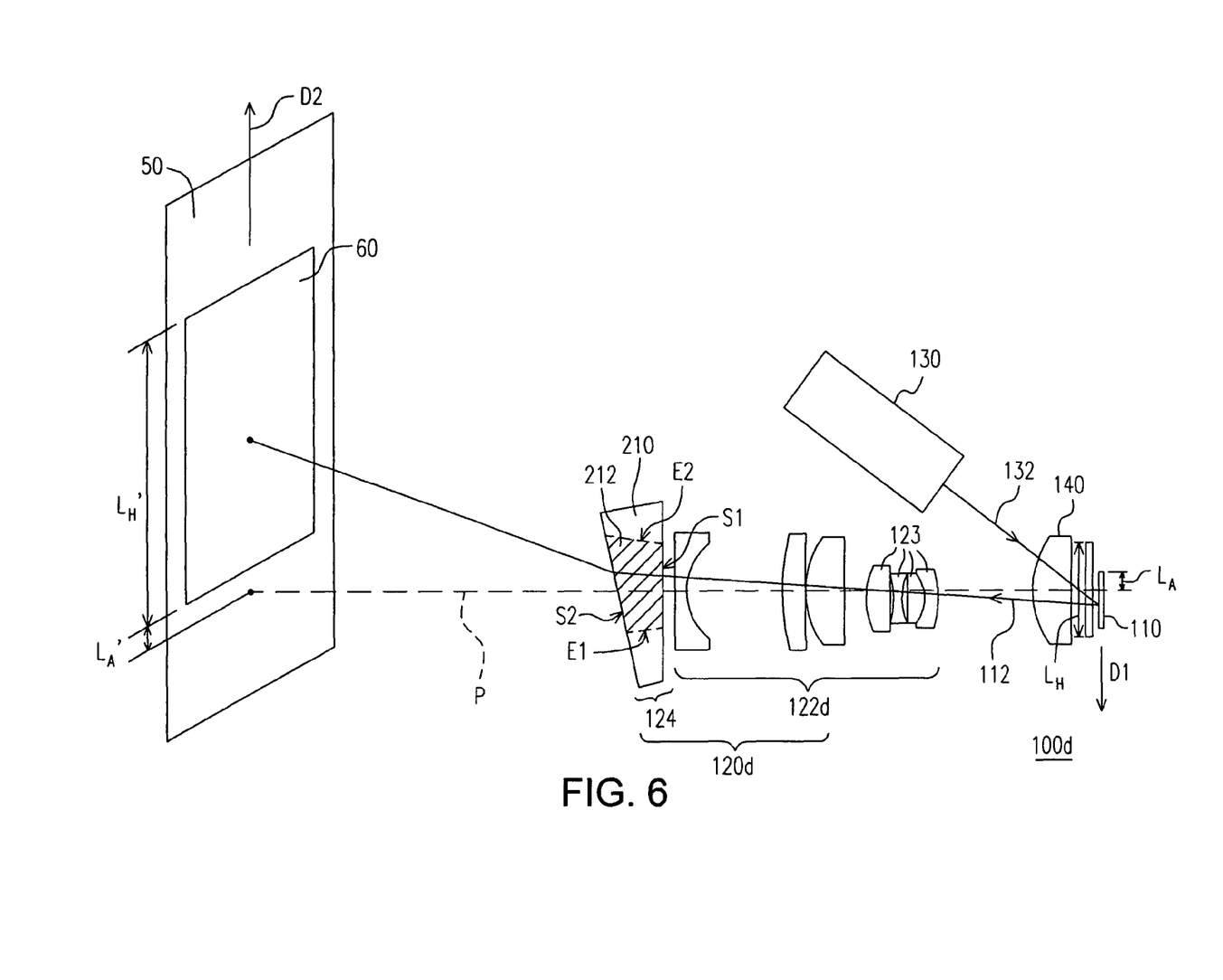
FIG. 6 is a structure diagram of a projection apparatus according to another embodiment of the invention.

Please refer to FIG. 6, the projection apparatus 100d of the embodiment is similar to the above-mentioned projection apparatus 100 (as shown in FIG. 1), and the differences between the projection apparatus 100d and the projection apparatus 100 are described as follows. The lens group 122d of the projection lens 120d of the projection apparatus 100d of the embodiment includes a plurality of eccentric lenses 123, and a geometrical center of the eccentric lenses 123 maintains a distance with the optical axis P of the projection lens 120d. The eccentric lenses 123 may be used to correct the aberration and colour difference of the image 60 to improve the quality of the image 60. In other embodiments, the projection lens 120d may adopt one eccentric lens 123 to correct the aberration.

Figure 7:
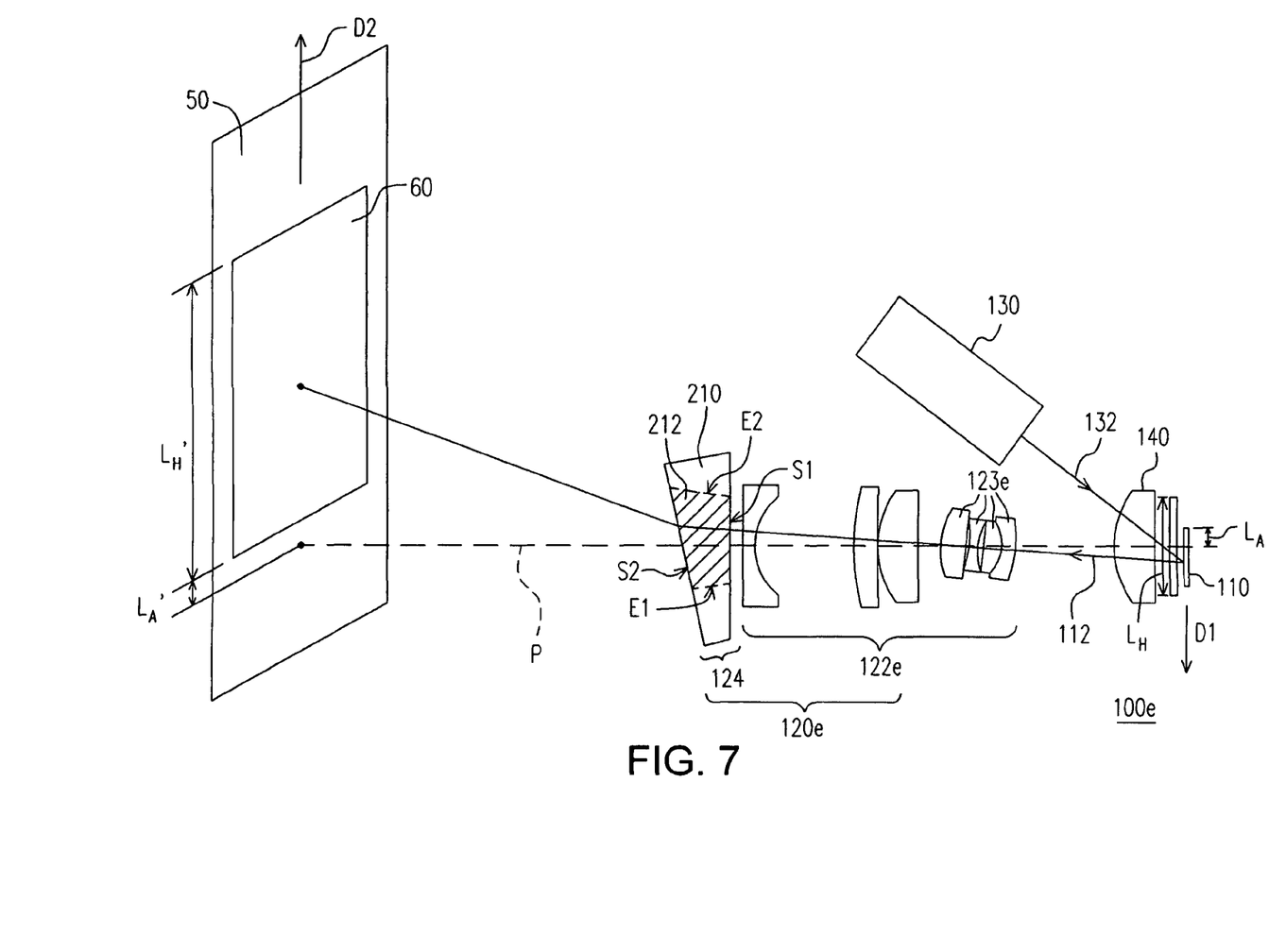
FIG. 7 is a structure diagram of a projection apparatus according to another embodiment of the invention.

Please refer to FIG. 7, the projection apparatus 100e of the embodiment is similar to the above-mentioned projection apparatus 100 (as shown in FIG. 1), and the differences between the projection apparatus 100e and the projection apparatus 100 are described as follows. The lens group 122e of the projection lens 120e of the projection apparatus 100e of the embodiment includes a plurality of tilted lenses 123e, and an optical axis of the tilted lenses 123e is tilted to the optical axis P of the projection lens 120e. The tilted lenses 123e may be used to correct the aberration and colour difference of the image 60 to improve the quality of the image 60. In other embodiments, the projection lens 120e may adopt one tilted lens 123e to correct the aberration.

Figure 8:
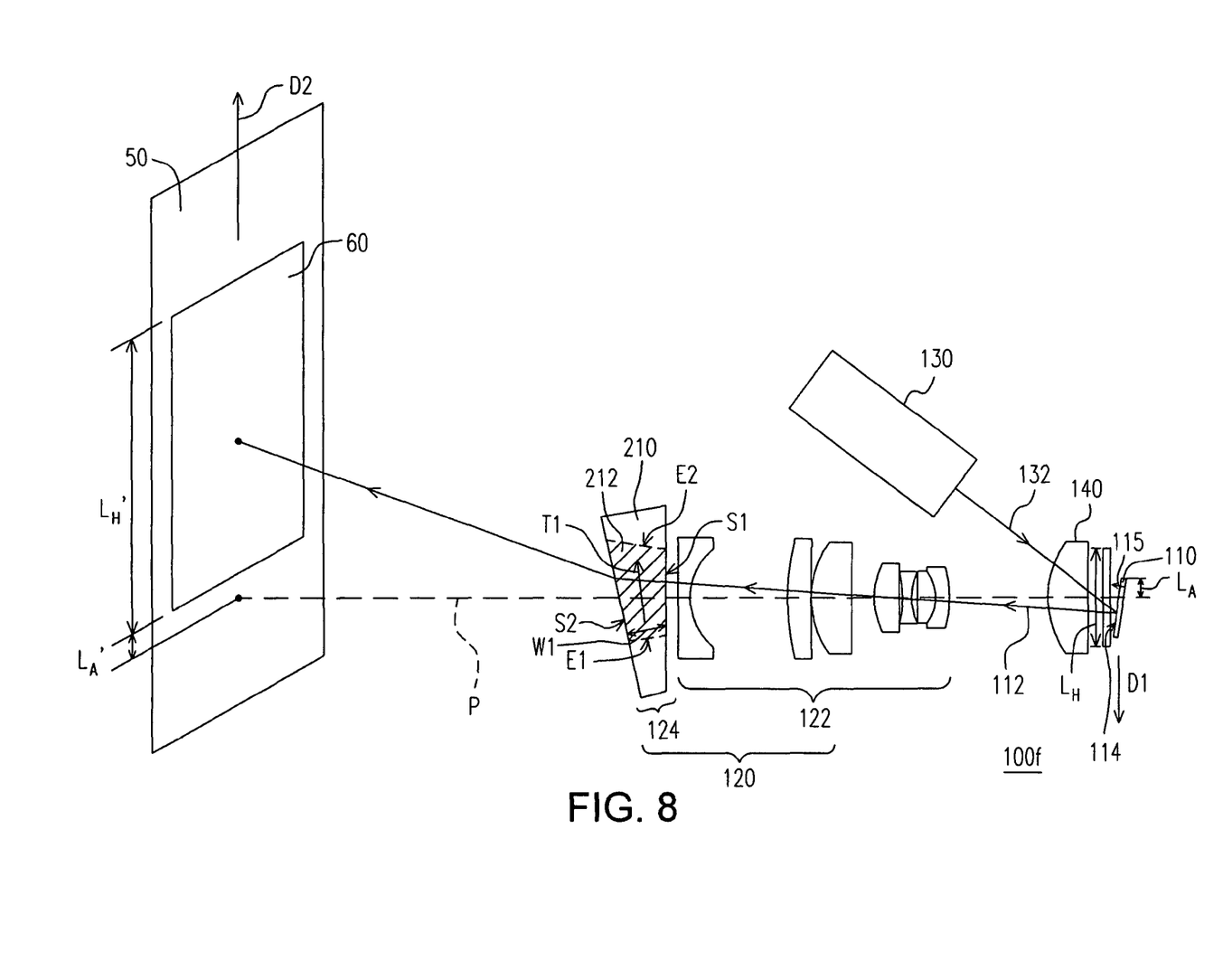
FIG. 8 is a structure diagram of a projection apparatus according to another embodiment of the invention.

Please refer to FIG. 8, the projection apparatus 100f of the embodiment is similar to the above-mentioned projection apparatus 100 (as shown in FIG. 1), and the differences between the projection apparatus 100f and the projection apparatus 100 are described as follows. The normal vector 115 of the active surface 114 of the light valve 110 in the projection apparatus 100f of the embodiment is tilted to the optical axis P of the projection lens 120, so as to correct the aberration and colour difference of the image 60, and to improve the quality of the image 60.

The system of the projection apparatus shown in FIG. 1 and FIGS. 3~8 takes the field lens with a telecentric system for example, but the invention may not limit here. In other embodiments, the projection apparatus may adopt a total internal reflection prism (TIR prism) with a telecentric system, a folding mirror with a non-telecentric system, and other projection systems. The following may list two embodiments.

Figure 9:
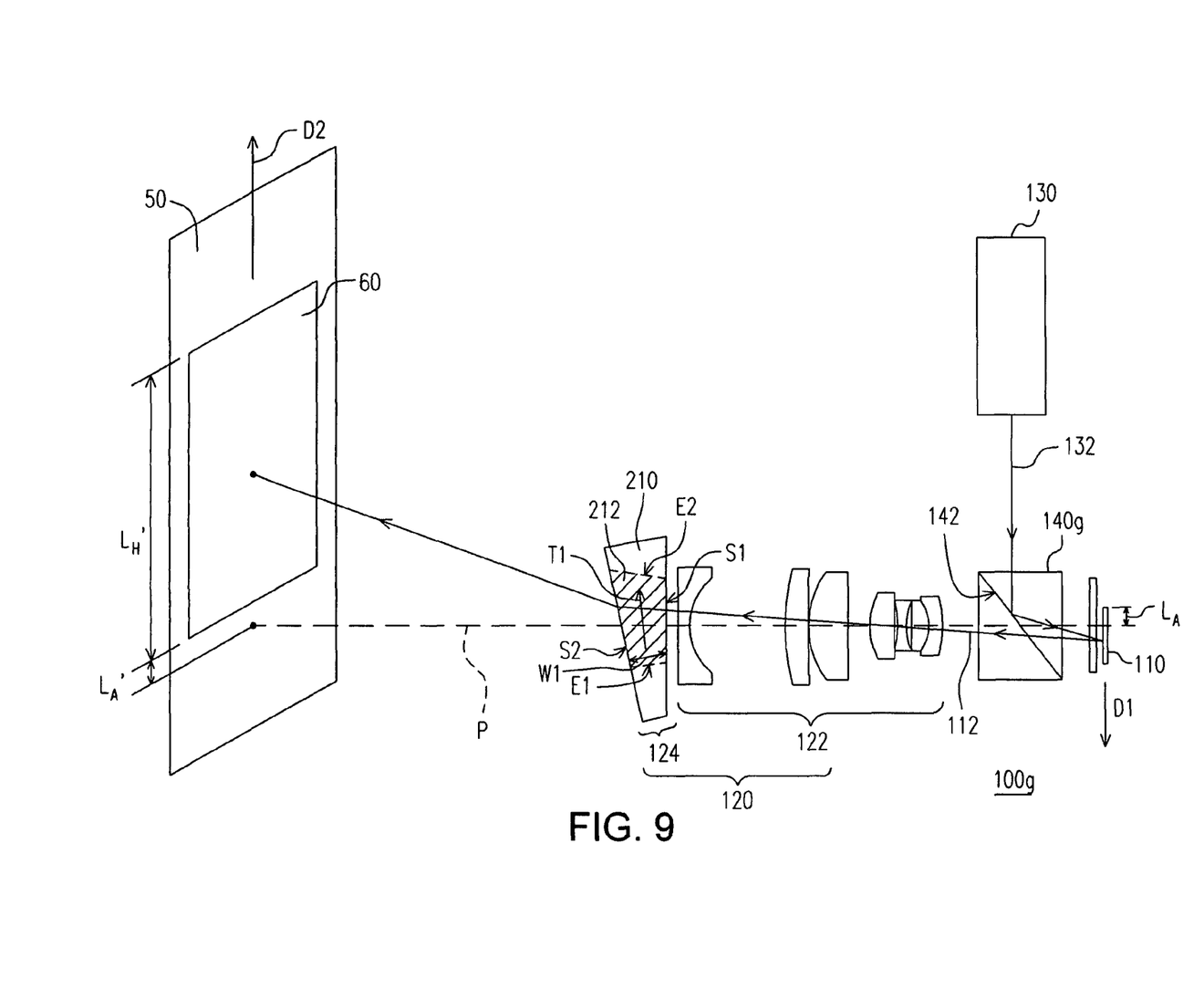
FIG. 9 is a structure diagram of a projection apparatus according to another embodiment of the invention.

Please refer to FIG. 9, the projection apparatus 100g of the embodiment is similar to the above-mentioned projection apparatus 100 (as shown in FIG. 1), and the differences between the projection apparatus 100g and the projection apparatus 100 are that the projection apparatus 100g replaces a FIR prism 140g with the field lens 140 in the projection apparatus 100 (as shown in FIG. 1). The TIR prism 140g has a total reflection surface 142, the total reflection surface 142 may totally reflect the illumination beam 132 from the illumination system 130 to the light valve 110, and the image beam 112 from the light valve 110 may pass through the total reflection surface 142 and transmit to the projection lens 120.

Figure 10:
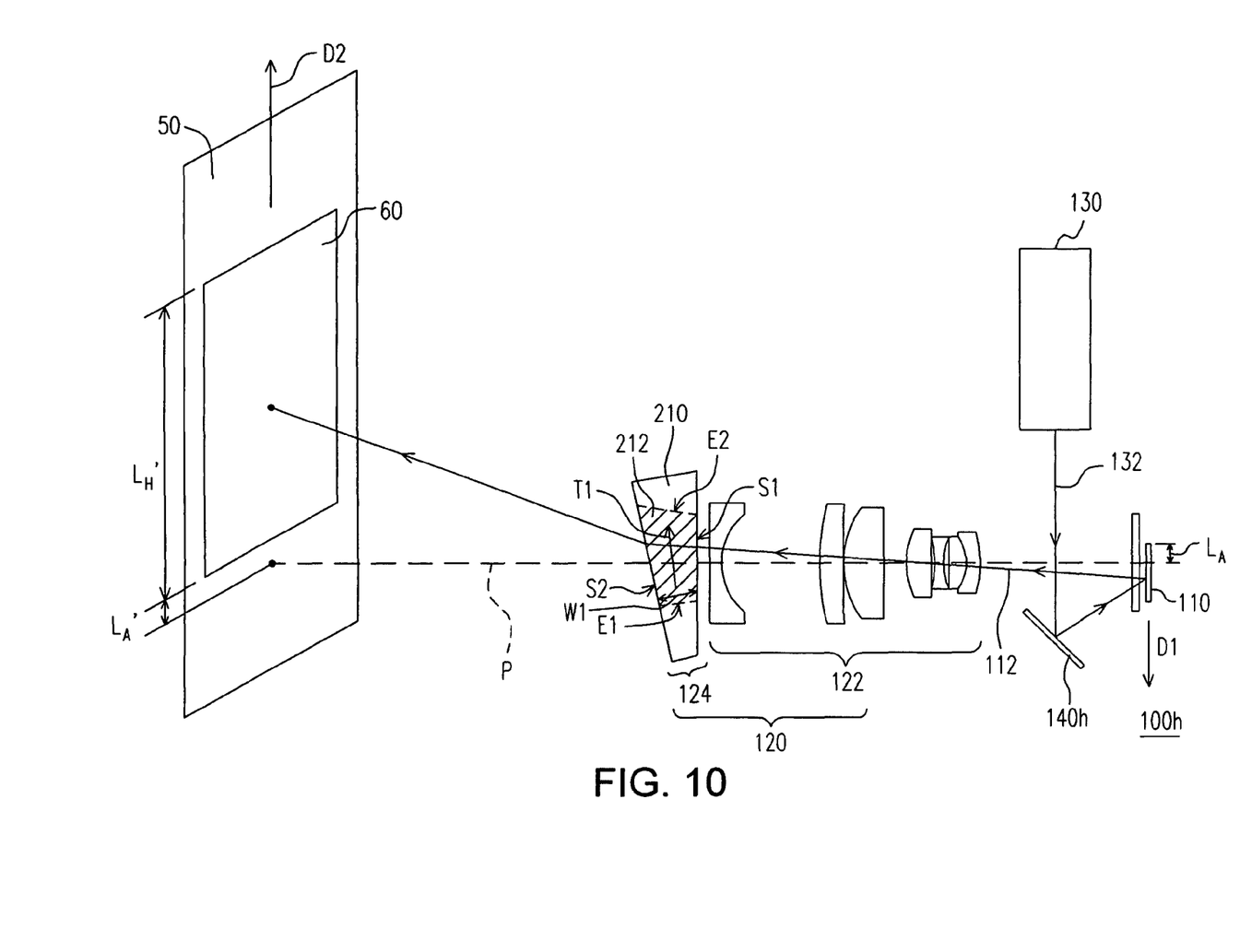
FIG. 10 is a structure diagram of a projection apparatus according to another embodiment of the invention.

Please refer to FIG. 10, the projection apparatus 100h of the embodiment is similar to the above-mentioned projection apparatus 100 (as shown in FIG. 1), and the differences between the projection apparatus 100h and the projection apparatus 100 are that the projection apparatus 100h replaces a folding mirror 140h with the field lens 140 in the projection apparatus 100 (as shown in FIG. 1). The folding mirror 140h is disposed in the transmission path of the illumination beam 132 of the illumination system 130 to reflect the illumination beam 132 to the light valve 110.

In summary, the embodiments of the invention may have at least one of the following advantages: the projection lens of the embodiment of the invention adopts the anamorphic device, wherein the thickness of the first light transmission area of the anamorphic device in the second end is more than the first end in first light transmission area. The offset of the image deviating from the optical axis is increased by the refraction function of the anamorphic transparent plate, so the offset of the light valve deviating from the optical axis may be designed with small size to reduce the maximum field. In this way, the outside diameter of the lens in the projection lens may be reduced to let the volume, the weight, and the designing difficulty of the projection lens reduce. Because the projection apparatus of the embodiment of the invention adopts the projection lens, the projection lens to occupy less space, and further makes the volume of the projection apparatus be reduced. In addition, the projection apparatus adopting the projection lens of the embodiment of the invention has lower weight and cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus capable of projecting an image on a screen, the projection apparatus comprising:
   a light valve, capable of generating an image beam; and
   a projection lens, disposed in the transmission path of the image beam, and disposed between the light valve and the screen to project the image beam to form the image on the screen, wherein the projection lens has an optical axis, the light valve deviates an offset of X % from the optical axis in a first direction, the image deviates an offset of Y % from the optical axis in a second direction, and the first direction is opposite to the second direction, the projection lens comprising:
   a lens group, disposed in the transmission path of the image beam; and
   an asymmetric anamorphic device, disposed in the transmission path of the image beam and disposed between the lens group and the screen to make X %<Y %, wherein the asymmetric anamorphic device comprises an anamorphic transparent plate, the anamorphic transparent plate has a first end, a second end opposite the first end relative to the optical axis, a thickness of the anamorphic transparent plate continuously increases from the first end to the second end, the anamorphic transparent plate has a first light transmission area capable of allowing the image beam to pass through, the first light transmission area has a first end and a second end opposite to the first end, an angle between a first extending direction and the second direction is less than 90 degrees, a thickness of the second end in the first light transmission area is more than a thickness of the first end in the first light transmission area, and the first end of the anamorphic transparent plate is closer to the first end of the first light transmission area than is the second end of the anamorphic transparent plate along a vertical direction.

2. The projection apparatus as claimed in claim 1, wherein the thickness of the first light transmission area increases from the first end to the second end.

3. The projection apparatus as claimed in claim 1, wherein the first light transmission area has a first light incident surface and a first light emitting surface opposite to the first light incident surface, the first light emitting surface is disposed between the first light incident surface and the screen, the first light incident surface and the first light emitting surface are respectively planes, and the anamorphic transparent plate is a prism.

4. The projection apparatus as claimed in claim 1, wherein the first light transmission area has a first light incident surface and a first light emitting surface opposite to the first light incident surface, the first light emitting surface is disposed between the first light incident surface and the screen, the first light incident surface and the first light emitting surface are respectively curved surfaces, and the anamorphic transparent plate is a lens.

5. The projection apparatus as claimed in claim 1, wherein the first light transmission area has a first light incident surface and a first light emitting surface opposite to the first light incident surface, the first light emitting surface is disposed between the first light incident surface and the screen, one of the first light incident surface and the first light emitting surface is a curved surface, the other of the first light incident surface and the first emitting surface is a plane, and the anamorphic transparent plate is a lens.

6. The projection apparatus as claimed in claim 1, wherein the asymmetric anamorphic device further comprises a compensation transparent plate disposed between the anamorphic transparent plate and the screen, the compensation transparent plate has a second light transmission area capable of allowing the image beam to pass through, the second light transmission area has a third end and a fourth end opposite to the third end, an angle between a second extending direction and the second direction is less than 90 degrees, and the thickness of the fourth end is less than the third end in the second light transmission area.

7. The projection apparatus as claimed in claim 6, wherein the thickness of the second light transmission area increases from the fourth end to the third end.

8. The projection apparatus as claimed in claim 6, wherein the second light transmission area has a second light incident surface and a second light emitting surface opposite to the second light incident surface, the second light emitting surface is disposed between the second light incident surface and the screen, the second light incident surface and the second light emitting surface are respectively planes, and the compensation transparent plate is a prism.

9. The projection apparatus as claimed in claim 6, wherein the second light transmission area has a second light incident surface and a second light emitting surface opposite to the second light incident surface, the second light emitting surface is disposed between the second light incident surface and the screen, the second light incident surface and the second light emitting surface are respectively curved surfaces, and the compensation transparent plate is a lens.

10. The projection apparatus as claimed in claim 6, wherein the second light transmission area has a second light incident surface and a second light emitting surface opposite to the second light incident surface, the second light emitting surface is disposed between the second light incident surface and the screen, one of the second light incident surface and the second light emitting surface is a curved surface, the other of the second light incident surface and the second light emitting surface is a plane, and the compensation transparent plate is a lens.

11. The projection apparatus as claimed in claim 6, wherein the first fight transmission area has a first light incident surface and a first fight emitting surface opposite to the first light incident surface, the first light emitting surface is disposed between the first light incident surface and the compensation transparent plate, the second light transmission area has a second light incident surface and a second fight emitting surface opposite to the second fight incident surface, the second fight emitting surface is disposed between the second light incident surface and the screen, the second light incident surface is adjacent to the first light emitting surface, and the shape of the second light incident surface is substantially coincident with the shape of the first light emitting surface.

12. The projection apparatus as claimed in claim 1, wherein a normal vector of an active surface of the light valve is tilted to the optical axis.

13. The projection apparatus as claimed in claim 1, wherein the lens group comprises at least a tilted lens, an optical axis of the tilted lens is tilted to the optical axis of the projection lens.

14. The projection apparatus as claimed in claim 1, wherein the lens group comprises an eccentric lens, a geometrical center of the eccentric lens maintains a distance with the optical axis of the projection lens.

15. A projection apparatus capable of projecting an image on a screen, the projection apparatus comprising:
    a light valve, capable of generating an image beam; and
    a projection lens, disposed in the transmission path of the image beam, and disposed between the light valve and the screen to project the image beam to form the image on the screen, wherein the projection lens has an optical axis, the light valve deviates from the optical axis in a first direction, the image deviates from the optical axis in a second direction, and the first direction is opposite to the second direction, the projection lens comprising:
        a lens group, disposed in the transmission path of the image beam; and
        an asymmetric anamorphic device, disposed in the transmission path of the image beam and disposed between the lens group and the screen, wherein the asymmetric anamorphic device comprises an anamorphic transparent plate, the anamorphic transparent plate has a first end, a second end opposite the first end relative to the optical axis, a thickness of the anamorphic transparent plate continuously increases from the first end to the second end, the anamorphic transparent plate has a first ht transmission area capable of allowing the image beam to pass through, the first light transmission area has a first end and a second end opposite to the first end, an angle between a first extending direction and the second direction is less than 90 degrees, a thickness of the second end in the first light transmission area is more than a thickness of the first end in the first light transmission area, and the first end of the anamorphic transparent plate is closer to the first end of the first light transmission area than is the second end of the enamor a vertical direction.

16. The projection apparatus as claimed in claim 15, wherein the asymmetric anamorphic device further comprises a compensation transparent plate disposed between the anamorphic transparent plate and the screen, the compensation transparent plate has a second light transmission area capable of allowing the image beam to pass through, the second light transmission area has a third end and a fourth end opposite to the third end, an angle between a second extending direction from the third end to the fourth end and the second direction is less than 90 degrees, and the thickness of the second light transmission area in the fourth end is less than the thickness of the second light transmission area in the third end.

17. A projection lens capable of projecting an image beam generating from a light valve to display an image on a screen, the projection lens comprising:
    an optical axis, wherein the light valve deviates an offset of X % from the optical axis in a first direction, the image deviates an offset of Y % from the optical axis in a second direction, and the first direction is opposite to the second direction;
    a lens group, disposed in the transmission path of the image beam; and
    an asymmetric anamorphic device, disposed in the transmission path of the image beam and disposed between the lens group and the screen to make X %<Y %, wherein the asymmetric anamorphic device comprises an anamorphic transparent plate, the anamorphic transparent plate has a first end, a second end opposite the first end relative to the optical axis, a thickness of the anamorphic transparent plate continuously increases from the first end to the second end, the anamorphic transparent plate has a first light transmission area capable of allowing the image beam to pass through, the first light transmission area has a first end and a second end opposite to the first end, an angle between a first extending direction and the second direction is less than 90 degrees, a thickness of the second end in the first light transmission area is more than a thickness of the first end in the first light transmission area, and the first end of the anamorphic transparent plate is closer to the first end of the first light transmission area than is the second end of the anamorphic transparent plate along a vertical direction.

18. The projection lens as claimed in claim 17, wherein the asymmetric anamorphic device further comprises a compensation transparent plate disposed between the anamorphic transparent plate and the screen, the compensation transparent plate has a second light transmission area capable of allowing the image beam to pass through, the second light transmission area has a third end and a fourth end opposite to the third end, an angle between a second extending direction and the second direction is less than 90 degrees, and the thickness of the fourth end is less than the third end in the second light transmission area.

19. The projection apparatus of claim 1, wherein the optical axis of the projection lens is perpendicular to the light valve.

20. The projection apparatus of claim 15, wherein the optical axis of the projection lens is perpendicular to the light valve.

21. The projection lens of claim 17, wherein the optical axis of the projection lens is perpendicular to the light valve.

* * * * *